United States Patent
Kawashima et al.

(10) Patent No.: US 7,819,573 B2
(45) Date of Patent: Oct. 26, 2010

(54) SPREAD ILLUMINATING APPARATUS

(75) Inventors: Satoshi Kawashima, Kitasaku-gun (JP); Hiroshi Takeshita, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 253 days.

(21) Appl. No.: 12/149,491

(22) Filed: May 2, 2008

(65) Prior Publication Data
US 2008/0298086 A1 Dec. 4, 2008

(30) Foreign Application Priority Data
May 30, 2007 (JP) ............................ 2007-143819

(51) Int. Cl.
*F21V 7/04* (2006.01)
(52) U.S. Cl. .................... 362/633; 362/97.1; 349/58
(58) Field of Classification Search ............... 362/632, 362/633, 634, 97.1–97.4, 362, 559–561, 362/225, 375; 349/58, 59, 60
See application file for complete search history.

(56) References Cited

U.S. PATENT DOCUMENTS

| | | | |
|---|---|---|---|
| 6,593,979 B1 * | 7/2003 | Ha et al. ..................... | 349/58 |
| 7,226,184 B2 * | 6/2007 | Takahashi .................. | 362/218 |
| 7,517,133 B2 * | 4/2009 | Han et al. ................... | 362/632 |
| 7,517,135 B2 * | 4/2009 | Yu ............................. | 362/633 |
| 7,760,287 B2 * | 7/2010 | Oohira ....................... | 349/58 |
| 2007/0064448 A1 * | 3/2007 | Yu et al. .................... | 362/633 |
| 2007/0115691 A1 * | 5/2007 | Yu ............................. | 362/632 |

FOREIGN PATENT DOCUMENTS
JP  A 2003-315793  11/2003

* cited by examiner

*Primary Examiner*—Bao Q Truong
(74) *Attorney, Agent, or Firm*—Oliff & Berridge, PLC

(57) ABSTRACT

A spread illuminating apparatus includes a light source, a light conductor plate having the light source at a side surface thereof, and a frame to house the light conductor plate, wherein the frame is basically composed of a metal core member and a resin body member which has an enclosed structure and which has recesses at outer surfaces of the enclosed structure.

4 Claims, 7 Drawing Sheets

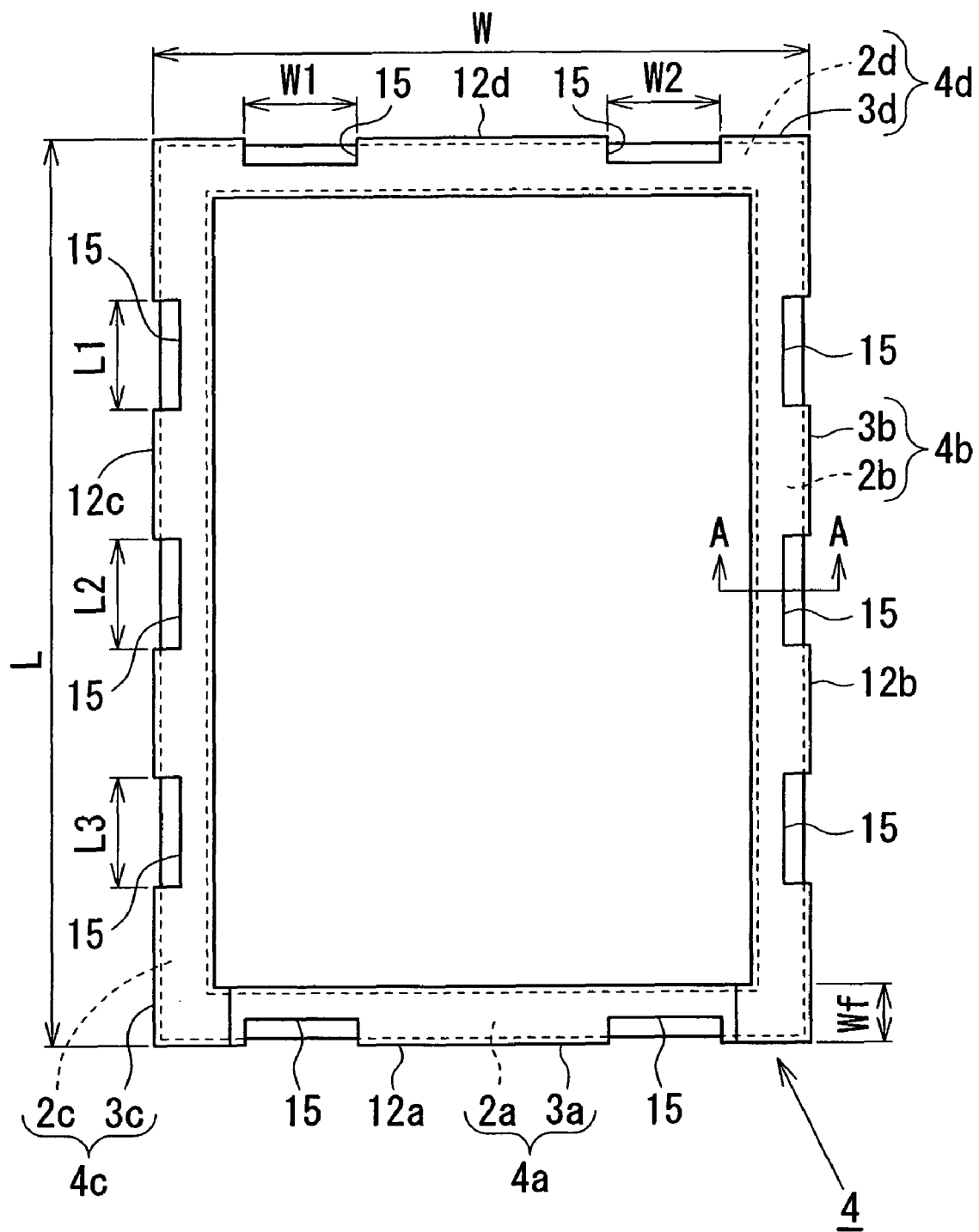

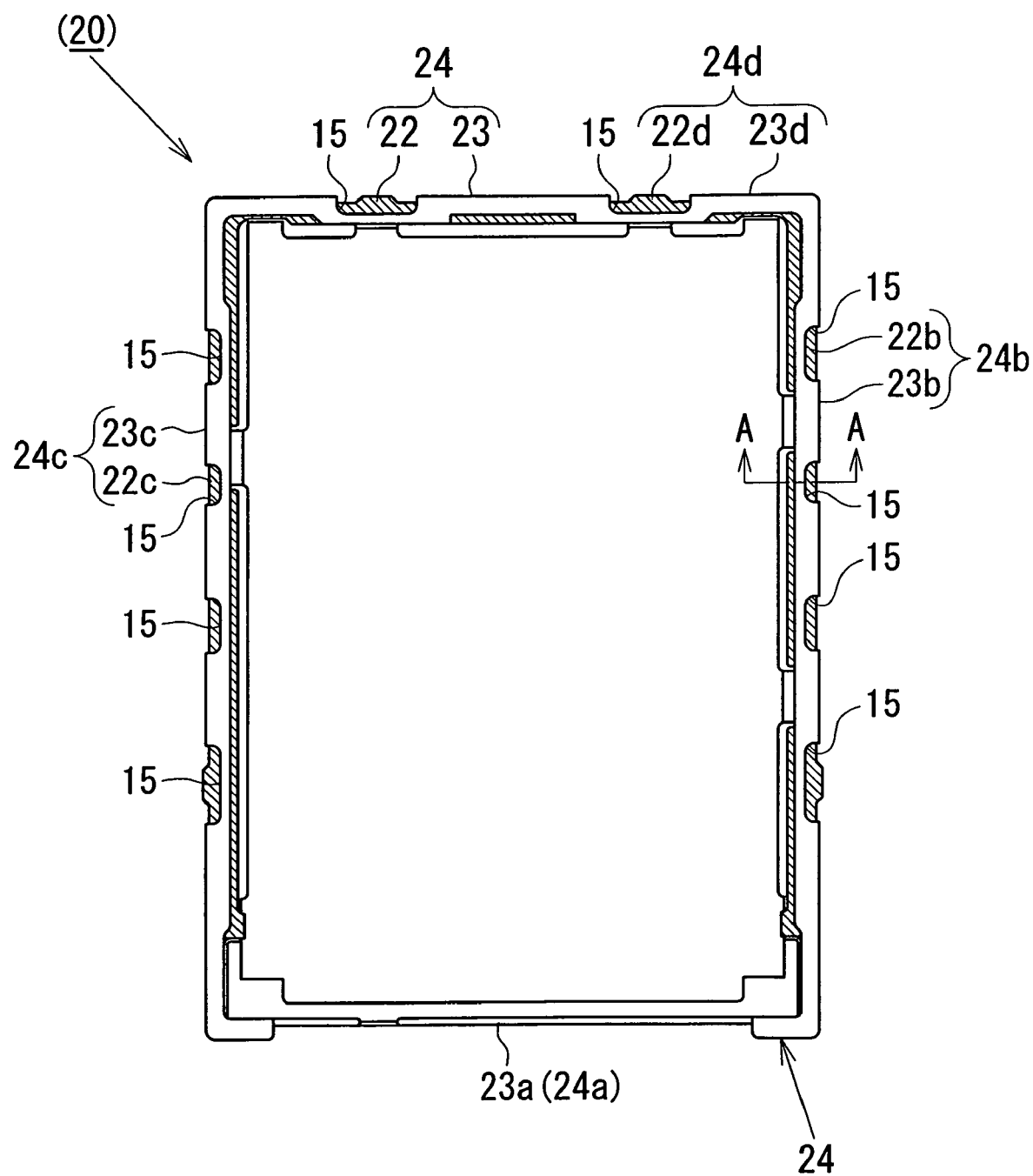

US 7,819,573 B2

SPREAD ILLUMINATING APPARATUS

BACKGROUND OF THE INVENTION

1. Field of the Invention

The present invention relates to a spread illuminating apparatus of side light type, and particularly to a spread illuminating apparatus used as a lighting means for a liquid crystal display device.

2. Description of the Related Art

A spread illuminating apparatus of side light type in which a point light source, such as a white light emitting diode (LED), as a light source is disposed at a side surface of a light conductor plate is used as a lighting means for a liquid crystal display (LCD) device for use in a mobile telephone and the like.

Referring to FIG. 5, a typical spread illuminating apparatus 100 generally includes a light conductor plate 104 with such optical elements as a light diffuser sheet 105 and prism sheets 106a and 106b, and further a resin frame which firmly houses the aforementioned members (refer to, for example, to Japanese Patent Application Laid-Open No. 2003-315793. And, a light source (not shown), such as an LED, is disposed toward one end of the resin frame 102 so as to face one side surface (for example, a side surface 104a in the figure) of the light conductor plate 104.

Thickness reduction is ever required of a spread illuminating apparatus, and therefore a light conductor plate as a main constituent member must be reduced in thickness and also a resin frame to house the light conductor plate is required to have a lower profile. However, if the resin frame is formed by molding simply with a low profile, its rigidity is lowered which results in an insufficient mechanical strength of a spread illuminating apparatus.

SUMMARY OF THE INVENTION

The present invention has been made in light of the problem described above, and it is an object of the present invention to provide a spread illuminating apparatus which assures a sufficient mechanical strength while having a low profile.

According to an aspect of the present invention, there is provided a spread illuminating apparatus including: a light source; a light conductor plate having the light source disposed at a side surface thereof, and a frame to house the light conductor plate, wherein the frame is composed of a metal core member and a resin body member which has an enclosed structure and which includes recesses disposed at the outer faces of the enclosed structure.

In the aspect of the present invention, the metal core member may be partly exposed from the recesses disposed at the outer faces of the enclosed structure of the resin body member.

In the aspect of the present invention, the enclosed structure of the resin body member may have a substantially polygonal shape, and the ratio of the aggregate dimension of widths of all recesses provided at one side of the polygonal shape with respect to the longitudinal dimension of the one side may range from 0.25 to 0.35.

In the aspect of the present invention, the recesses of the one side may be each provided at every 10 to 20 mm distance.

Accordingly, the spread illuminating apparatus described above assures a high rigidity and dimensional accuracy while having a low profile.

Also, since the inner faces of the frame which oppose the side surfaces of the light conductor plate can be structured the same as those of a conventional resin frame, the optical properties are prevented from deteriorating compared with the conventional resin frame while achieving a low profile.

BRIEF DESCRIPTION OF DRAWINGS

FIG. 2A is an explanatory top plan view of a frame of the spread illuminating apparatus of FIG. 1;

FIG. 3A is a top plan view of a frame of a spread illuminating apparatus according to a second embodiment of the present invention;

DETAILED DESCRIPTION OF THE INVENTION

Exemplary embodiments of the present invention will hereinafter be described with reference to the accompanying drawings.

A first embodiment of the present invention will be described with reference to FIG. 1 and FIGS. 2A and 2B.

Figure 1:
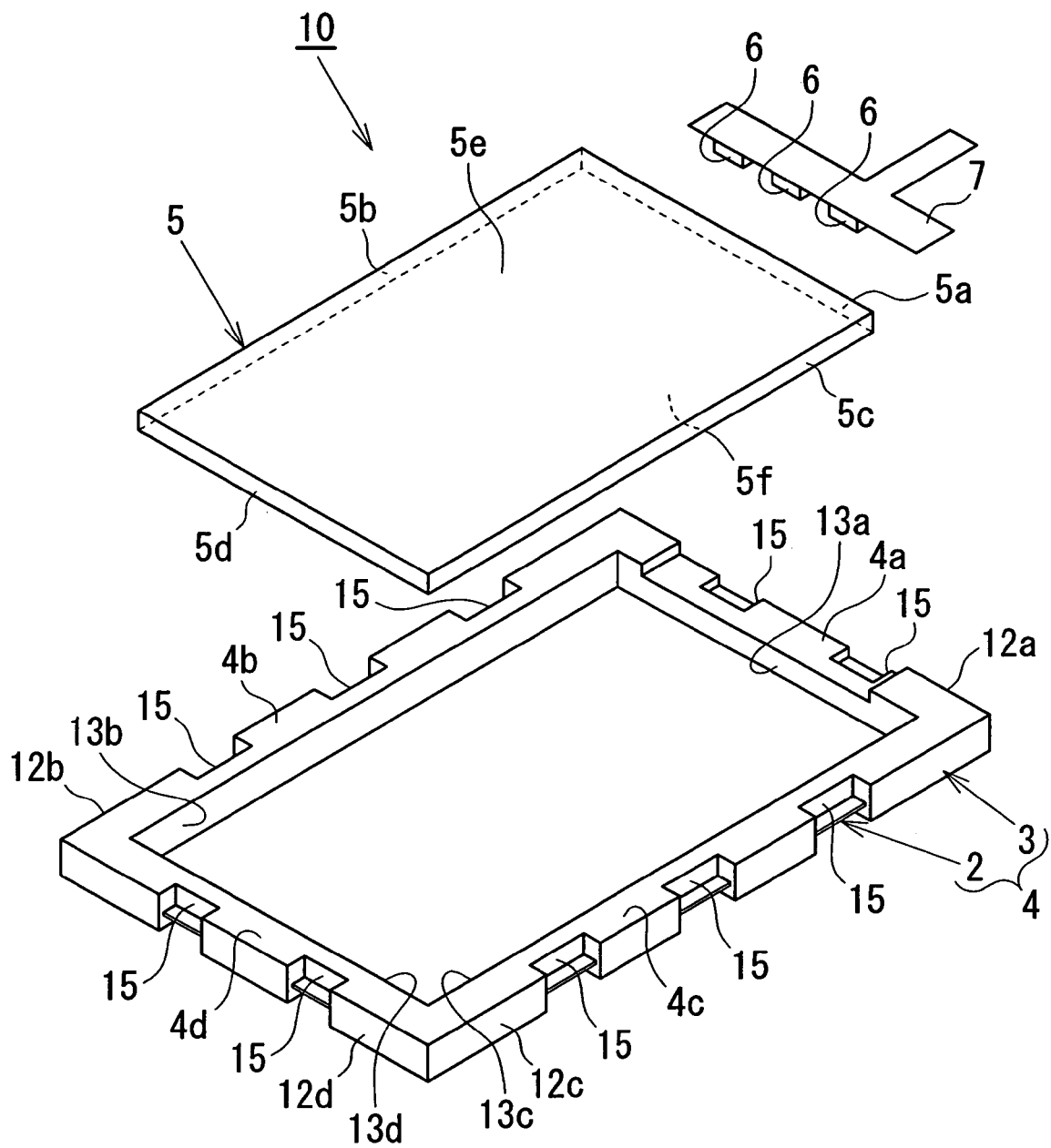
FIG. 1 is an exploded perspective view of a spread illuminating apparatus according to a first embodiment of the present invention.

Referring to FIG. 1, a spread illuminating apparatus 10 according to the first embodiment basically includes a light conductor plate 5 having a rectangular shape, and a frame 4 to firmly house the light conductor plate 5. The frame 4 is composed of four side-segments 4a, 4b, 4c and 4d serially connected to one another so as to form a substantially rectangular shape, and the light conductor plate 5 is fitted in an empty space defined and enclosed by the side-segments 4a to 4d of the frame 4. LEDs 6 mounted on a flexible printed circuit (FPC) board 7 are also housed in the empty space so as to face a side surface 5a of the light conductor plate 5.

Figure 5:
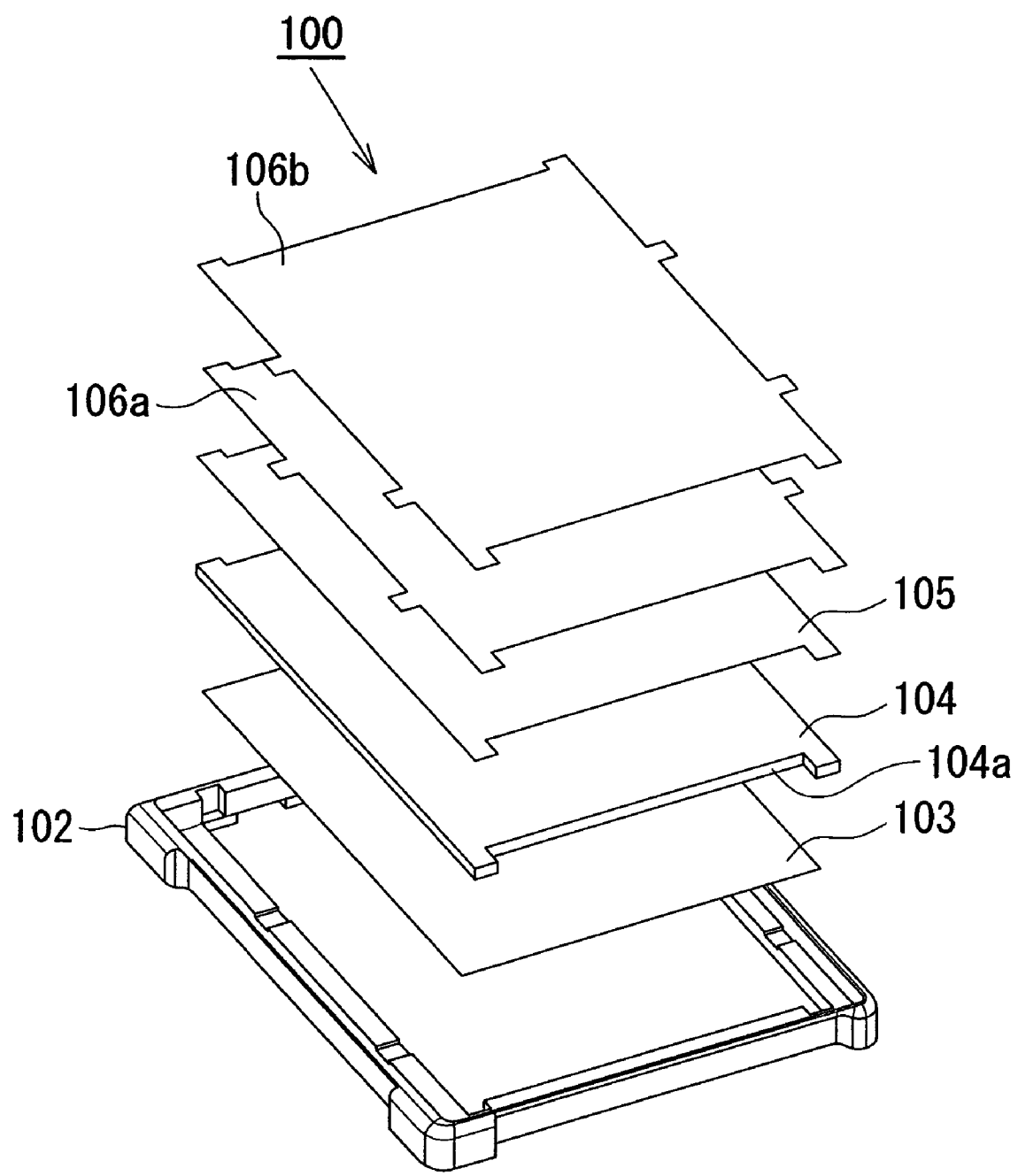
FIG. 5 is an exploded perspective view of a main portion of a conventional spread illuminating apparatus.

Though not shown, the spread illuminating apparatus 10 may include, for example, a reflector disposed at a major surface 5f of the light conductor plate 5, and a light diffuser sheet and prism sheets disposed at another major surface 5e like the spread illuminating apparatus 100 of FIG. 5 described above, and the frame 4 may house those optical members together with the light conductor plate 5.

In the present embodiment, the frame 4 includes a metal core member 2 and a resin body member 3 which are combined into a unitary structure by insert-molding.

Figure 2B:
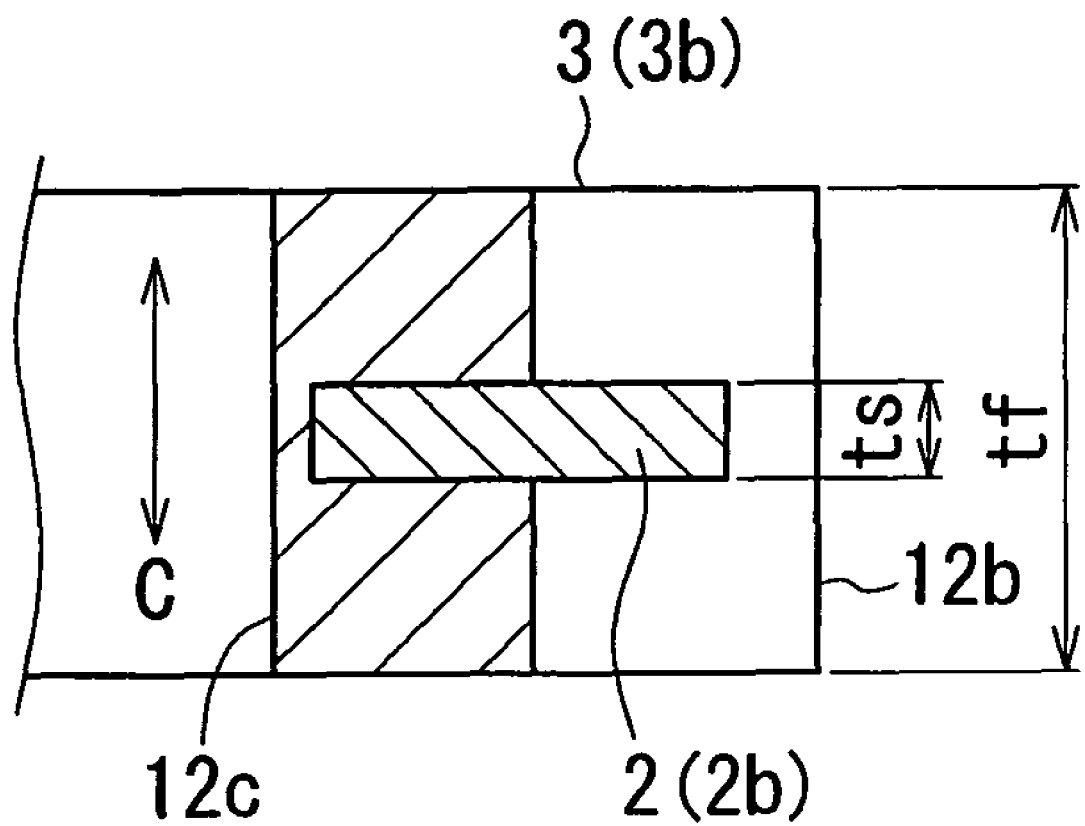
FIG. 2B is a cross sectional view of a portion of the frame of FIG. 2A taken along a line A-A.

Referring to FIGS. 2A and 2B, the metal core member 2 includes four side-strips 2a, 2b, 2c and 2d serially connected to one another so as to form a substantially rectangular shape having a rectangular opening thereinside, and the resin body member 3 includes four side-bars 3a, 3b, 3c and 3d serially connected to one another so as to form a substantially rectangular shape, wherein the side-strips 2a to 2d of the metal core member 2 are combined respectively with the side-bars 3a to 3d of the resin body member 3 in a unitary manner, thus constituting the side-segments 4a to 4d of the frame 4. Recesses 15 are formed at each of outer faces 12a, 12b, 12c and 12d of the side-segments 4a to 4d of the frame 4, more specifically the side-bars 3a to 3d of the resin body member 3.

The metal core member 2 is arranged such that the direction of a thickness (ts) of the metal core member 2 is substantially parallel with a thickness direction (C) of the light conductor plate 5 held in the frame 4. The outer area of the side-strip 2a/2b/2c/2d of the metal core member 2 is partly exposed from the resin body member 3 at portions having the recesses 15. On the other hand, the inner area of the side-strip 2a/2b/2c/2d of the metal core member 2 is not exposed from the resin body member 3 at any portions, and thus inner faces 13a, 13b, 13c and 13d of the side-segments 4a to 4d of the frame 4 are totally constituted by the resin body member 3 only. Accordingly, when the light conductor plate 5 is placed in the empty space of the frame 4, side surfaces 5b, 5c and 5d (except the aforementioned side surface 5a which faces the LEDs 6) of the light conductor plate 5 oppose respectively the inner faces 13b, 13c and 13d of the frame 4, which are constituted by the resin body member 3 only as described above.

In the spread illuminating apparatus 10 described above, the frame 4 achieves a low profile and at the same time maintains a high rigidity. This advantage is made possible by the frame 4 structured such that the resin body member 3 contains the metal core member 2 unitarily combined therewith, and also that the recesses 15 are formed at the outer faces 12a to 12d thereof. Description will be further made below.

If the frame 4 includes the metal core member 3 unitarily combined with the resin body member 3 by insert-molding as described above but does not have the recesses 15 formed at the resin body member 3, then the frame 4 is caused to greatly warp due to difference in shrinkage rate between the materials of the metal core member 2 and the resin body member 3, and consequently it is difficult to control the dimensional accuracy. In the present embodiment, since the recesses 15 provided at the resin body member 3 of the frame 4 work to ease and disperse stresses generated by the process of resin molding, the frame 4 is suppressed from warping, and the advantage described above is duly achieved thus ensuring a high dimensional accuracy.

The ratio of the aggregate dimension of widths of the recesses 15 with respect to the longitudinal dimension of each side bar 3a/3b/3c/3d of the resin body member 3 (specifically, (L1+L2+L3)/L in case of the side-bars 3b and 3c where L1, L2 and L3 are the widths of the respective recesses 15 at the side-bar 3b/3c having a longitudinal dimension L, and (W1+W2)/W in case of the side-bars 3a and 3d where W1, W2 and W3 are the widths of the respective recesses 15 at the side-bar 3a/3d having a longitudinal dimension W) preferably ranges between 0.25 and 0.35. And, it is more preferable that the recesses 15 are each provided at every 10 to 20 mm distance.

For example, if the longitudinal dimension W of the side-bar 3a/3d is 35 mm, and the longitudinal dimension L of the side bar 3b/3c is 50 mm, two or three of the recesses 15 are provided at the side-bar 3a/3d (two in FIG. 2A), and three to five of the recesses 15 are provided at the side-bar 3b/3c (three in FIG. 2A).

With the dimensional arrangement described above, the spread illuminating apparatus 10 achieves well balanced properties in view of dimensional accuracy, mechanical strength and moldability.

Further, in the spread illuminating apparatus 10, when the light conductor plate 5 is held in the frame 4, since the side surfaces 5b, 5c and 5d of the light conductor plate 5 oppose the inner faces 13b, 13c and 13d of the frame 4 which are constituted by the resin body member 3 only, lights exiting from the side surfaces 5b, 5c and 5d of the light conductor plate 5 are reflected at the inner faces 13b, 13c and 13d of the frame 4 and reintroduced in the light conductor plate 5, and thus the structure of the frame 4, specifically the unitary structure of the metal core member 2 combined with the resin body member 3 by insert-molding together with the provision of the recesses 15 for prevention of warpage, does not adversely affect the above described transmission of lights which is a very important function in terms of optical property, thus enabling, at least, maintenance of the optical property obtained by a conventional resin frame.

The metal core member 2 partly exposed from the recesses 15 readily allows a ground connection, which is advantageous in enhancing a shielding performance against high frequency noises. This structure is advantageous especially when the metal core member 2 is not allowed to be exposed but for the recesses 15.

The advantages of the spread illuminating apparatus 10 will be described by using specific example dimensions for FIGS. 2A and 2B.

If a frame equivalent in dimension to the frame 4 with W=37.6 mm, L=52.4 mm, and Wf=1.43 mm is conventionally made by resin molding without the metal core member 2, its thickness must be 1.5 mm or more for mechanical strength, and in some cases a metal frame having a thickness of 0.15 to 0.3 mm to cover the resin frame may be additionally used for reinforcement. On the other hand, in case of the frame 4 with the same dimension (W=37.6 mm, L=52.4 mm, and Wf=1.43 mm) according to the present invention which is made by insert-molding using the metal core member 2 formed of a stainless steel plate (for example, SUS304), its thickness (tf) can be reduced to about 1.0 mm (1.15 mm in the embodiment). Further, it is verified that the warp amount of the frame 4 provided with the recesses 15 according to the present invention is less than one fourth or even one fifth of the warp amount of a frame having the same unitary structure of the metal core member 2 and the resin body member 3 as the frame 4 but without the recesses 15, and a high dimensional accuracy is achieved.

A second embodiment of the present invention will be described with reference to FIGS. 3A and 3B, wherein focus is made on differences from the spread illuminating apparatus 10 of FIGS. 1, 2A and 2B according to the first embodiment with common features omitted as appropriate.

Referring to FIG. 3A, a spread illuminating apparatus 20 according to the second embodiment includes a frame 24 which basically includes a metal core member 22 and a resin body member 23 which is unitarily combined with the metal core member 22 by insert-molding.

The metal core member 22 (whose exposed portions are indicated by hatching in the figure) includes three side-strips 22b, 22c and 22d which are serially connected to one another so as to form a square C with an open side located opposite to the side-strip 22d, and the resin body member 23 includes four side-bars 23a, 23b, 23c and 23d which are serially connected to one another so as to form a rectangular shape having an opening thereinside. The side-strips 22b, 22c and 22d of the metal core member 22 are united respectively with the side-bars 23b, 23c and 23d of the resin member 23 by insert-molding thereby forming side-segments 24b, 24c and 24d of the frame 24 while a side-segment 24a of the frame 24 is formed by the side-bar 23a alone of the resin body member 23.

Recesses 15 are provided at the outer face of each of the side-bars 23b, 23c and 23d of the resin body member 23 unitarily combined with the side-strips 22b, 22c and 22d of the metal core member 22, and the outer area of the metal core member 22 is partly exposed from the recesses 15. The frame 24 structured as described above according to the second embodiment provides the same advantages as the frame 4 according to the first embodiment.

Figure 3B:
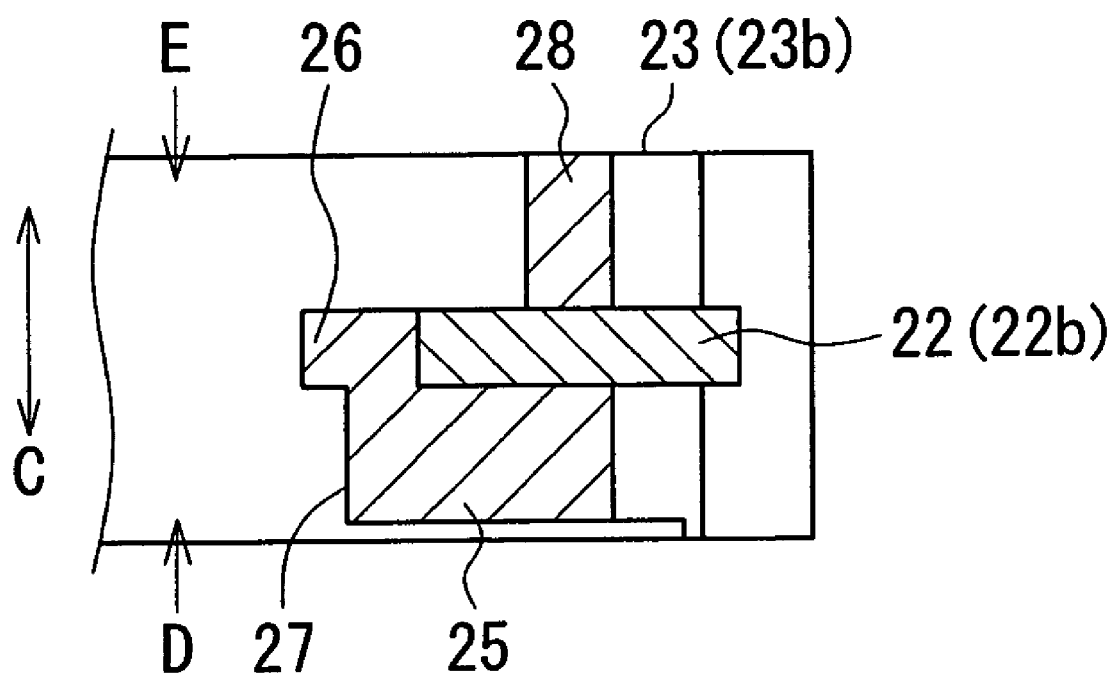
FIG. 3B is a cross sectional view of a portion of the frame of FIG. 3A taken along a line A-A.

Referring to FIG. 3B, the side-bars 23b, 23c and 23d of the resin body member 23 each have a step structure at its inner face in the thickness direction of the apparatus, specifically a thick portion 25 located at its lower side and a thin portion 28 located at its upper side. The inner area of the metal core member 22 is also exposed because of the thin portion 28 receding from the thick portion 25, and a projection 26 is provided at the tip end of the thick portion 25 so as to be flush with the metal core member 22.

The frame 24, which includes the resin body member 23 including the side-bars 23b, 23c and 23d having the step structure described above, is excellent in view of dimensional accuracy, mechanical strength and moldability, and the spread illuminating apparatus 20 according to the second embodiment, which incorporates the frame 24, is well balanced in those properties.

In the spread illuminating apparatus 20 including such the frame 24, a light conductor plate and a reflector are placed onto the frame 24 in a direction D in FIG. 3B, and a light diffuser sheet and prism sheets are placed onto the frame 24 in a direction E.

When a light conductor plate is held in the empty space of the frame 24, the side surfaces of the light conductor plate except one side surface facing LEDs oppose the inner faces (for example, inner face 27 in FIG. 3B) of the side-segments 24b, 24c and 24d of the frame 24 which are constituted by the resin body member 23 only.

Figure 4:
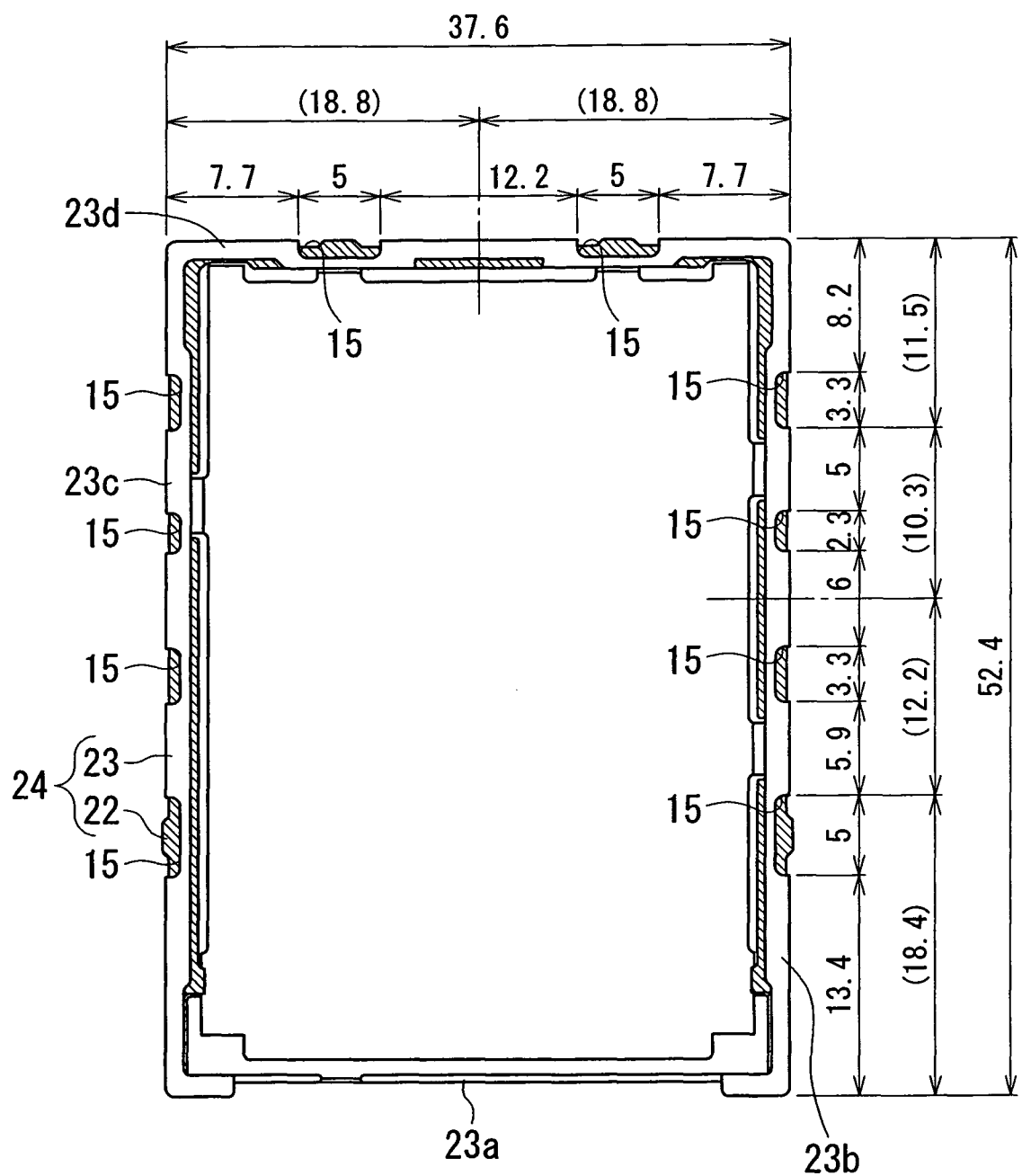
FIG. 4 is a schematic top plan view of exemplary dimensions for the frame of FIG. 3A.

Referring to FIG. 4 showing exemplary dimensions for the frame 24 having a width of 37.6 mm and a length of 52.4 mm, description will be made of the width dimension of the recess 15 which is preferably determined in order to reduce the frame thickness to about 1 mm (for example, 1.15 mm) while achieving a favorable dimensional accuracy, mechanical strength and moldability. About the recesses 15 provided at the side-bar 23d, the ratio of the aggregate dimension of the widths of the two recesses 15 with respect to the longitudinal dimension of the side-bar 23d is $(5+5)/37.6 \approx 0.27$ which falls within the 0.25 to 0.35 ratio range explained herein earlier. Also, the two recesses 15 are each provided at every 18.8 mm distance as shown by (18.8) in the figure, which falls within the 10 to 20 mm distance range explained herein earlier.

Now, about the recesses 15 provided at the side bar 23b (or 23c), the ratio of the aggregate dimension of the widths of the four recesses 15 with respect to the longitudinal dimension of the side-bar 23b (or 23c) is $(3.3+2.3+3.3+5)/52.4 \approx 0.27$ which falls within the 0.25 to 0.35 range. Also, the four recesses 15 are provided respectively at distances of 11.5 mm, 10.3 mm, 12.2 mm and 18.4 mm as shown by (11.5, 10.3, 12.2 and 18.4) in the figure, which falls within the 10 to 20 mm distance range.

The present invention has been explained with respect to exemplary embodiments but is not limited thereto. For example, in the embodiments described above, the frame 4/24 is composed of the metal core member 2/22 and the resin body member 3/23 insert-molded into a unitary structure and has an opening thereinside, but a metal reflector disposed at the bottom of the light conductor plate may be used as the metal core member 3/23 and combined with the resin body member 3/23 thereby forming a frame having no opening.

What is claimed is:

1. A spread illuminating apparatus comprising:
   a light source;
   a light conductor plate having the light source disposed at a side surface thereof; and
   a frame to house the light conductor plate, wherein the frame comprises a flat metal core member and a resin body member which has an enclosed structure and which includes recesses disposed at outer faces of the enclosed structure, the flat metal core member being horizontally sandwiched through an interior of the resin body member.

2. A spread illuminating apparatus according to claim 1, wherein the flat metal core member is partly exposed from the recesses disposed at the outer faces of the enclosed structure of the resin body member.

3. A spread illuminating apparatus according to claim 1, wherein the enclosed structure of the resin body member has a substantially polygonal shape, and a ratio of an aggregate dimension of widths of all recesses provided at one side of the polygonal shape with respect to a longitudinal dimension of the one side ranges from 0.25 to 0.35.

4. A spread illuminating apparatus according to claim 3, wherein the recesses of the one side are each provided at every 10 to 20 mm distance.

* * * * *